United States Patent
Yu et al.

(10) Patent No.: US 11,215,828 B1
(45) Date of Patent: Jan. 4, 2022

(54) IN FIELD VISOR CHARACTERIZATION FOR VISOR PROJECTED DISPLAYS

(71) Applicant: Rockwell Collins, Inc., Cedar Rapids, IA (US)

(72) Inventors: Ming Yu, Beaverton, OR (US); Christopher A. Keith, Wilsonville, OR (US); Francois Raynal, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/054,791

(22) Filed: Aug. 3, 2018

(51) Int. Cl.
*G02B 27/01* (2006.01)
*G06F 3/01* (2006.01)

(52) U.S. Cl.
CPC ..... *G02B 27/0172* (2013.01); *G02B 27/0149* (2013.01); *G06F 3/013* (2013.01); *G02B 2027/0161* (2013.01); *G02B 2027/0187* (2013.01)

(58) Field of Classification Search
CPC ............ G02B 27/0172; G02B 27/0149; G02B 2027/0187; G02B 2027/0161; G06F 3/013
See application file for complete search history.

(56) References Cited

U.S. PATENT DOCUMENTS

| | | | | |
|---|---|---|---|---|
| 6,424,437 B1 * | 7/2002 | Popovich | ................. | G02B 5/32 348/E5.137 |
| 6,480,174 B1 * | 11/2002 | Kaufmann | ......... | G02B 27/0172 345/7 |
| 6,662,370 B1 * | 12/2003 | Buchanan, Jr. | .......... | A42B 3/04 2/422 |
| 7,046,215 B1 * | 5/2006 | Bartlett | .................... | G01S 5/163 345/8 |
| 7,841,026 B2 * | 11/2010 | Makris | ................. | A42B 3/0433 2/424 |
| 8,023,772 B2 * | 9/2011 | Jin | ........................... | G06K 9/32 348/36 |
| 9,229,237 B2 * | 1/2016 | Margulis | ............ | G02B 27/0172 |
| 9,323,056 B2 * | 4/2016 | Williams | ............. | G02B 27/017 |
| 9,618,750 B2 | 4/2017 | Simmonds et al. | | |
| 9,618,751 B2 | 4/2017 | Simmonds et al. | | |
| 9,703,101 B2 * | 7/2017 | de Matos Peteira Vieira | ............. | G02B 27/0172 |
| 9,726,889 B2 | 8/2017 | Gallery et al. | | |
| 9,729,774 B2 * | 8/2017 | Ueda | ................... | H04N 5/23212 |
| 10,082,865 B1 * | 9/2018 | Raynal | .................... | G06F 3/013 |
| 10,168,772 B2 * | 1/2019 | Kim | ...................... | H04N 13/344 |
| 10,271,042 B2 * | 4/2019 | Rougeaux | .......... | G02B 27/0172 |

(Continued)

*Primary Examiner* — Grant Sitta
(74) *Attorney, Agent, or Firm* — Suter Swantz pc llo

(57) ABSTRACT

A system for characterizing a visor mounted to a helmet, the helmet having at least one projector for directing light to reflect off the visor to image to an eye position, is described. The system includes a mounting structure configured to mount an image detector to the helmet, the image detector arranged to detect an image at the eye position, and a controller. The controller is configured to provide a test pattern, receive a detected image from the image detector disposed at an eye position based on the test pattern, compare the detected image to the test pattern to determine a characterization error corresponding to a distortion of the detected image, determine a correction function to correct the distortion, and correct for the distortion based on the correction function.

17 Claims, 4 Drawing Sheets

(56) References Cited

U.S. PATENT DOCUMENTS

| | | | |
|---|---|---|---|
| 10,277,893 B1* | 4/2019 | Yoon | H04N 5/2356 |
| 2006/0018550 A1* | 1/2006 | Rash | G06T 7/0002 |
| | | | 382/218 |
| 2007/0273983 A1* | 11/2007 | Hebert | G02B 5/1895 |
| | | | 359/708 |
| 2010/0265169 A1* | 10/2010 | Baudou | A42B 3/0433 |
| | | | 345/156 |
| 2010/0283412 A1* | 11/2010 | Baudou | A42B 3/0433 |
| | | | 315/307 |
| 2010/0302356 A1* | 12/2010 | Sinivaara | G02B 27/017 |
| | | | 348/61 |
| 2011/0187835 A1* | 8/2011 | Park | H04N 13/30 |
| | | | 348/51 |
| 2011/0248904 A1* | 10/2011 | Miyawaki | G02B 27/017 |
| | | | 345/7 |
| 2012/0069155 A1* | 3/2012 | Shim | H04N 13/398 |
| | | | 348/51 |
| 2012/0162764 A1* | 6/2012 | Shimizu | H04N 13/327 |
| | | | 359/473 |
| 2012/0293395 A1 | 11/2012 | Williams | |
| 2013/0187943 A1* | 7/2013 | Bohn | G02B 27/0093 |
| | | | 345/619 |
| 2014/0000014 A1 | 1/2014 | Redpath et al. | |
| 2014/0111864 A1 | 4/2014 | Margulis et al. | |
| 2014/0198100 A1* | 7/2014 | Yu | H04N 13/30 |
| | | | 345/419 |
| 2014/0333665 A1* | 11/2014 | Sylvan | G06F 3/013 |
| | | | 345/633 |
| 2015/0103147 A1* | 4/2015 | Ho | G06T 7/85 |
| | | | 348/47 |
| 2015/0160460 A1* | 6/2015 | Komatsu | G02B 27/0172 |
| | | | 359/629 |
| 2015/0226970 A1* | 8/2015 | Mukawa | G02B 6/0031 |
| | | | 345/8 |
| 2015/0243068 A1* | 8/2015 | Solomon | H01L 27/156 |
| | | | 345/419 |
| 2016/0225164 A1* | 8/2016 | Tomlin | G06T 7/40 |
| 2016/0225173 A1* | 8/2016 | Liang | G06T 11/60 |
| 2016/0314564 A1* | 10/2016 | Jones | G06T 3/0093 |
| 2016/0353094 A1* | 12/2016 | Rougeaux | G02B 27/0172 |
| 2017/0193687 A1* | 7/2017 | Lo | G06T 5/006 |
| 2017/0208313 A1* | 7/2017 | Taketomi | H04N 13/128 |
| 2017/0295362 A1* | 10/2017 | Travis | H04N 13/344 |
| 2018/0049636 A1* | 2/2018 | Miller | A61B 5/04842 |
| 2018/0074317 A1* | 3/2018 | Robbins | G02B 6/0075 |
| 2018/0124387 A1* | 5/2018 | Zhao | H04N 17/002 |
| 2018/0197503 A1* | 7/2018 | Sasaki | G09G 3/002 |
| 2018/0266847 A1* | 9/2018 | Trythall | G01C 25/005 |
| 2019/0378301 A1* | 12/2019 | Lee | H04N 13/296 |
| 2020/0073476 A1* | 3/2020 | Tiwari | G06F 3/011 |

* cited by examiner

IN FIELD VISOR CHARACTERIZATION FOR VISOR PROJECTED DISPLAYS

The inventive concepts disclosed herein generally relate to visor characterization, and a system for conducting visor characterization.

BACKGROUND

Helmet mounted displays (HMDs) may be mounted with a helmet to provide a visual display to be seen by a wearer of the helmet. For example, the HMD may include a visor which is mounted with a helmet.

Geometric ray error of a HMD can be classified as collimation error and characterization error. Collimation error refers to the fact that the ray angle into the eye can change (or swim) as the eye position is shifted from the center to a side of the designed eye box. In an ideal system with no collimation error, each pixel of the display provides a collimated beam such that the eye sees the image at infinity with parallel collimated beams coming from the directions of each pixel. In practice, however, the beams from each pixel are not perfectly collimated, and collimation error exists.

Even for high quality optics with negligible collimation error, a large image distortion may be inherent and requires correction (by software/firmware), such as through calibration and/or characterization. The characterization error refers to the residual error of the correction. The characterization error may be quite small if the visor and the helmet mounted with the visor are characterized as a pair at the Optical Test Bench at the factory. The visor, however, can be damaged in the field requiring the helmet be mounted with a new visor. When a new visor is installed without recharacterization of the new visor to the helmet in use, characterization error may become large and can impact performance.

There are different approaches to address the characterization error in the case a new visor is required. A straightforward approach is to screen every visor to a tight tolerance in order to make them appear identical to the Display system. This approach, however, causes a reduced yield since more visors are rejected. Another approach is to ship the new visor and helmet as a unit back to the factory to characterize the visor and helmet as a pair. This approach, however, is time consuming.

SUMMARY

In one aspect, embodiments of the inventive concepts disclosed herein are directed to a system for characterizing a visor mounted to a helmet, or a head attachment region generally, the helmet having at least one projector for directing light to reflect off the visor to image to a right eye position and/or a left eye position. The system includes a mounting structure configured to mount the image detectors to the helmet with the visor. A first image detector is arranged at a right eye position to detect an image for the right eye position. A second image detector is arranged at a left eye position to detect an image for the left eye position. A controller is configured to provide a test pattern, receive a first detected image from the first image detector disposed at the right eye position based on the test pattern, receive a second detected image from the second image detector disposed at the left eye position based on the test pattern, compare the first detected image to the test pattern to determine a first characterization error corresponding to a first distortion of the first detected image, compare the second detected image to the test pattern to determine a second characterization error corresponding to a second distortion of the second detected image, determine a first correction function to correct the first distortion, determine a second correction function to correct the second distortion, and correct for the first distortion and the second distortion based on the first correction function and the second correction function.

In a further aspect, embodiments of the inventive concepts disclosed herein are directed to a method for characterizing a visor mounted to a helmet, or a head attachment region generally, the helmet having at least one projector for directing light to reflect off the visor to image to a right eye position and a left eye position. The method includes: removing a first visor from the helmet; attaching a second visor to the helmet; receiving a first detected image from a first image detector disposed at a right eye position based on a test pattern; receiving a second detected image from a second image detector disposed at a left eye position based on the test pattern; comparing the first detected image to the test pattern to determine a first characterization error corresponding to a first distortion of the first detected image; comparing the second detected image to the test pattern to determine a second characterization error corresponding to a second distortion of the second detected image; determining a first correction function to correct the first distortion; determining a second correction function to correct the second distortion; and correcting for the first distortion and the second distortion based on the first correction function and the second correction function.

In a further aspect, embodiments of the inventive concepts disclosed herein are directed to a system for characterizing a visor mounted to a helmet, or a head attachment region generally, the helmet having at least one projector for directing light to reflect off the visor to image to an eye position. The system includes a mounting structure configured to mount an image detector to the helmet with visor, an image detector arranged at an eye position to detect an image for the eye position, and a controller. The controller is configured to provide a test pattern, receive a detected image from the image detector disposed at an eye position based on the test pattern, compare the detected image to the test pattern to determine a characterization error corresponding to a distortion of the detected image, determine a correction function to correct the distortion, and correct for the distortion based on the correction function.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Embodiments of the inventive concepts disclosed herein regarding a system or method for characterizing a visor mounted to a helmet, the helmet having a projector for directing light to reflect off the visor to image to an eye position, allows for in field calibration to remove characterization error.

Figure 1A:
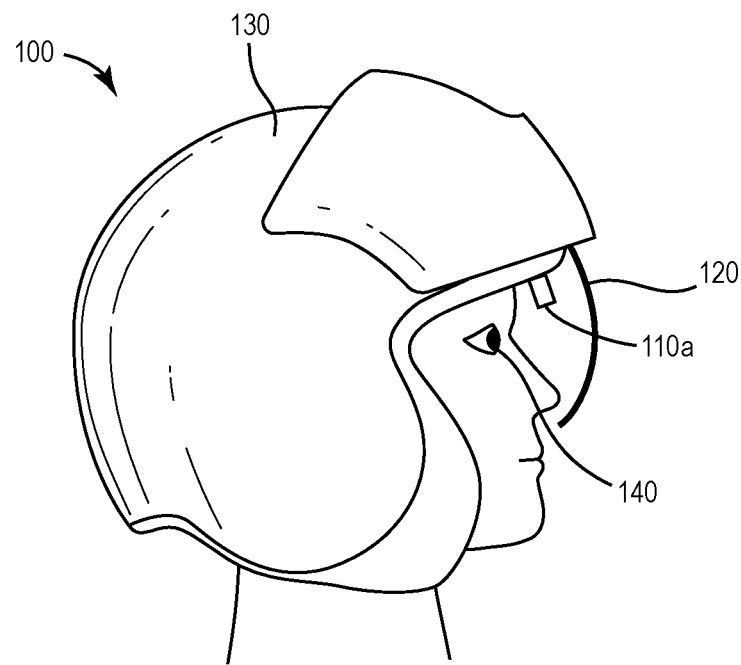
FIG. 1A illustrates a HMD system including a helmet mounted projector and a visor shown positioned relative to a right eye of a helmet wearer.
Figure 1B:
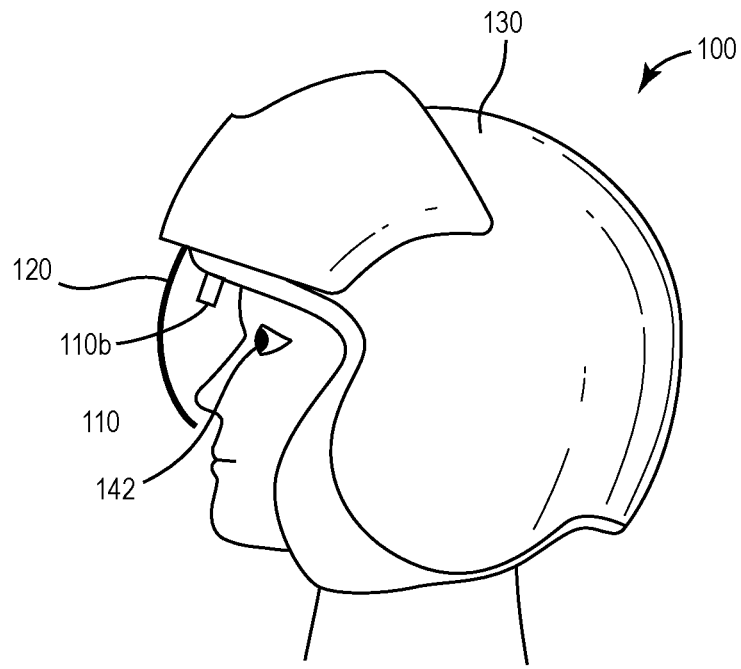
FIG. 1B illustrates a HMD system including a helmet mounted projector and a visor shown positioned relative to a left eye of a helmet wearer.

FIGS. 1A and 1B illustrates a HMD system 100, or a head worn display system generally, including at least one helmet mounted projector (110a and 110b) mounted on a helmet 130, or a head attachment region generally, and a visor 120. The system 100 of FIG. 1A is shown positioned relative to a right eye 140 of a wearer of the helmet 130. FIG. 1B is a view illustrating a portion of the system 100 positioned relative to a left eye 142 of a wearer of the helmet 130.

The helmet 130 includes projector 110a mounted on the helmet 130. The projector 110a directs light to reflect off the visor 120 to image for a position of the right eye 140. Similarly, the projector 110b, mounted on the helmet 130, directs light to reflect off the visor 120 to image for a position of the left eye 142. The visor 120 may be partially reflecting so that a user of the helmet 130 may see through the visor 120.

The projectors 110a and 110b may also be arranged so that projector 110a reflects light off the visor 120 to image for the position of the left eye 142, and so that projector 110b reflects light off the visor 120 to image for the position of the right eye 140.

Figure 2:
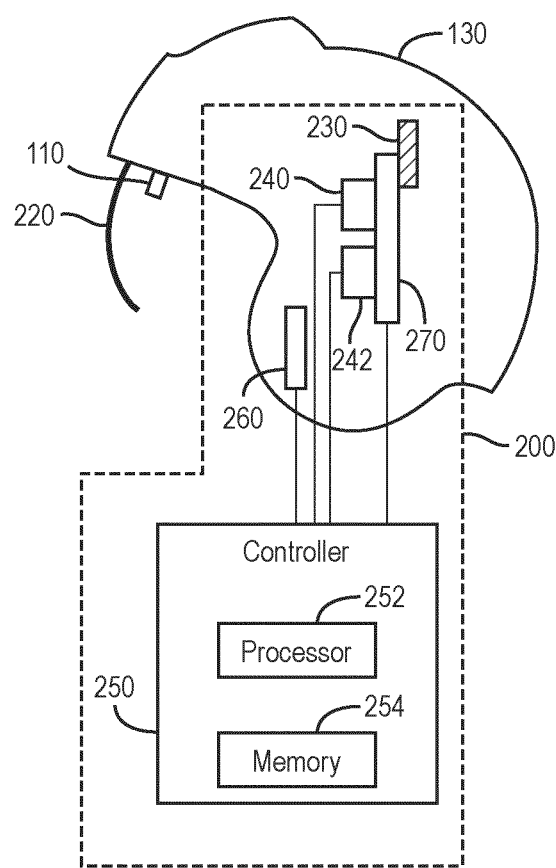
FIG. 2 is a schematic illustrating a system for in field characterization of a visor according to inventive concepts disclosed herein.

FIG. 2 is a schematic illustrating a system 200 for in field characterization of a visor 220 mounted to a helmet 130, the helmet having at least one projector 110 for directing light to reflect off the visor 220 to image to a right eye position and a left eye position. The system 200 includes a mounting structure 230, a first image detector 240 at the right eye position, a second image detector 242 at a left eye position, a controller 250 and a temperature detector 260. The system 200 does not include the helmet 130, visor 220 and the at least one projector 110, but rather is designed to work with the helmet 130, visor 220 and the at least one projector 110. Only a portion of the helmet 130 is shown in FIG. 2 for ease of seeing the components of the system 200.

The mounting structure 230 rigidly connects the helmet 130 to the first image detector 240 and the second image detector 242. The mounting structure 230 may rigidly connect to the first image detector 240 and the second image detector 242 via a translator 270, for example, which independently translates the first image detector 240 and the second image detector 242. The mounting structure 230 may be made of a stiff material, such as a metal, for example. Alternatively, the system 200 need not have a mounting structure that rigidly connects the helmet 130 to the first image detector 240 and the second image detector 242.

The translator 270 translates the first image detector 240 and the second image detector 242 so that the first image detector 240 and the second image detector 242 are moved to the position corresponding to positions of the eyes of a user when the visor 220 and helmet 130 are in use. The translator 270 may be an x-y-z translator, for example, to translate the first image detector 240 and the second image detector 242 in a x-y-z coordinate system. The translator 270 preferably independently translates the first image detector 240 and the second image detector 242 so that the first image detector 240 may be independently translated relative to the second image detector 242.

The translator 270 may translate the first image detector 240 to the position of a right eye of the user when the visor 220 and helmet 130 are in use, and may translate the second image detector 242 to the position of a left eye of the user when the visor 220 and helmet 130 are in use, for example. In this regard, information regarding the positions of the right eye and left eye of a particular user relative to the visor 220 and helmet 130 may be stored, such as in the memory 254 of the controller 250, for example. The controller 250 may control the translator 270 to translate the first image detector 240 and the second image detector 242 to a desired position.

The controller 250 may include, in addition to the memory 254, a processor 252. The controller 250 is connected to a number of the components to control those components and/or provide information to or receive information from those components. The controller 250 is connected to the translator 270, the first image detector 240 and the second image detector 242, the at least one projector 110, and the temperature detector 260, for example.

The first image detector 240 and the second image detector 242 detect an image based on light directed from the at least one projector 110 and reflected off the visor 220. The first image detector 240 and the second image detector 242 may be cameras, for example, such as cameras typically used in a cell phone.

In particular, first image detector 240 and the second image detector 242 may detect an image provided by the at least one projector 110 and visor 220 based on a test pattern input to the at least one projector 110. The test pattern may be stored in the memory 254 of controller 250, for example, and input from the controller 250 to the at least one projector 110. To improve the quality of the captured image, a background subtraction technique can be used as follows: first display a flat black test pattern and capture it by the image detector, second display the real test pattern and capture it by the image detector, then the real image is the subtraction of the two.

For characterization for both eye positions, the at least one projector 110 may include the projectors 110a and 110b (see FIGS. 1A and 1B), and the test pattern is input to both of the projectors 110a and 110b independently. The image viewed by the first image detector 240 based on the test pattern input is subject to characterization error, and is thus distorted. Likewise, the image viewed by the second image detector 242 based on the test pattern input is subject to characterization error, and is thus also distorted. In general, the characterization error of the image viewed by the first image detector 240 will be different from the characterization error of the image viewed by the second image detector 240.

Returning to FIG. 2, the controller 250 receives a first detected image from the first image detector 240, where the first image detector 240 is disposed at a right eye position, based on the test pattern. Further, the controller 250 receives a second detected image from the second image detector 242, where the second image detector 242 is disposed at a left eye position, based on the test pattern.

Figure 3A:
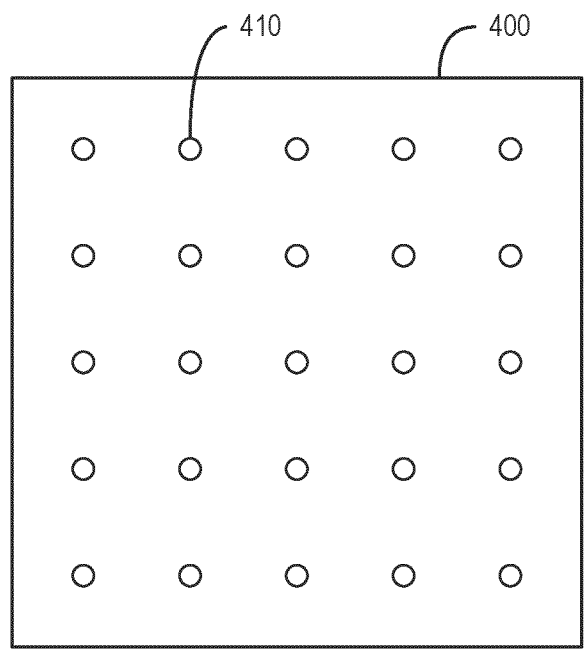
FIG. 3A illustrates an exemplary test pattern for use with the system of FIG. 2 according to inventive concepts disclosed herein.
Figure 3B:
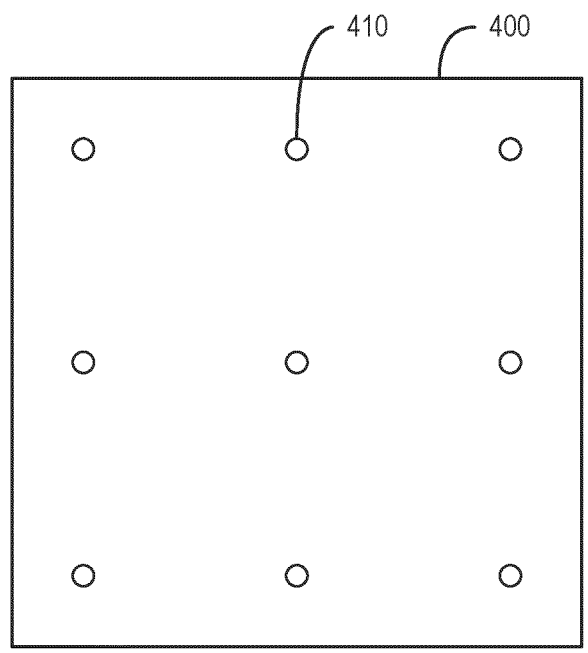
FIG. 3B illustrates another exemplary test pattern for use with the system of FIG. 2 according to inventive concepts disclosed herein.

FIGS. 3A and 3B illustrate exemplary test patterns 400, where the test pattern 400 in FIG. 3A is denser than that in FIG. 3B. Both FIG. 3A and FIG. 3B illustrate objects 410, in this case dots, arranged in a regular pattern. For ease of illustration, FIG. 3A illustrates only a 5×5 array, and FIG. 3B illustrates a 3×3 array. In general, the number of objects 410 may be many more than in a 5×5 or 3×3 array.

Referring back to FIG. 2, the temperature detector 260 may be arranged to detect the temperature of the first image detector 240 and the second image detector 242. In the case the image detectors 240 and 242 are cameras, the temperature is compensated for. The magnification of some cameras can change with temperature. This causes a change of the image captured, losing fidelity, which is to be avoided. This effect, however, can be undone by software if these changes are calibrated vs temperature offline and saved, for example, as a look up table. In this case the temperature is monitored and the lookup table is used to undo the image change, gaining back fidelity.

Further, while the objects 410 are shown as dots in FIGS. 3A and 3B, the objects 410 may be other dots. The objects 410 may be, for example, straight or curved line segments. The straight or curved line segments may be separated or connected, for example. The object 410 need not be arranged in a regular array.

The controller 250 compares the first detected image from the first image detector 240 to the test pattern, which is undistorted, to determine a first characterization error corresponding to a first distortion of the first detected image. Likewise, the controller 250 compares the second detected image from the second image detector 242 to the test pattern to determine a second characterization error corresponding to a second distortion of the second detected image.

The controller 250 then determines a first correction function to correct the first distortion. Likewise, the controller 250 determines a second correction function to correct the second distortion.

To correctly display the intended pattern, the angular coordinate (u, v) in visual space is mapped to image source (eg, LCD) coordinate (x, y) via nonlinear function F and G that depend on some coefficients $A_i$ and $B_i$ (i=1 to n). For example, to display a bright dot in the visual direction of [u,v], the pixel at [x, y] on LCD may be lit up where $[x,y]=[F(A_1 \ldots A_n, u, v), G(B_1 \ldots B_n, u, v)]$. These functions and coefficients may be stored in a memory of the HMD. If the coefficients are incorrect due to characterization error, the perceived test pattern will not match the intended pattern, for example, the centroid of the dots will be in the wrong location visually and therefore in the wrong location captured by the image detectors (which function as electronic eyes). In other words, the distortion will show up on the captured test pattern. The coefficients may be tweaked by the controller 250 until captured test pattern matches the intended test pattern stored in the file of the controller 250. Then the new coefficients will replace the old ones in the memory. Both the F and G can be polynomials of u and v, and $A_i$ and $B_i$ are coefficients of those polynomials. To match the intended pattern, it may be sufficient to tweak a small subset of the coefficients that are of low orders in the polynomial. The matching of the captured test pattern and the intended one can be quantified by centroid differences of all the dots between the captured and intended test patterns. The algorithm to speed up the tweaking can be damped-least-square. Denser test patterns will generally improve confidence level at the expanse of process speed and algorithm complication.

Figure 4:
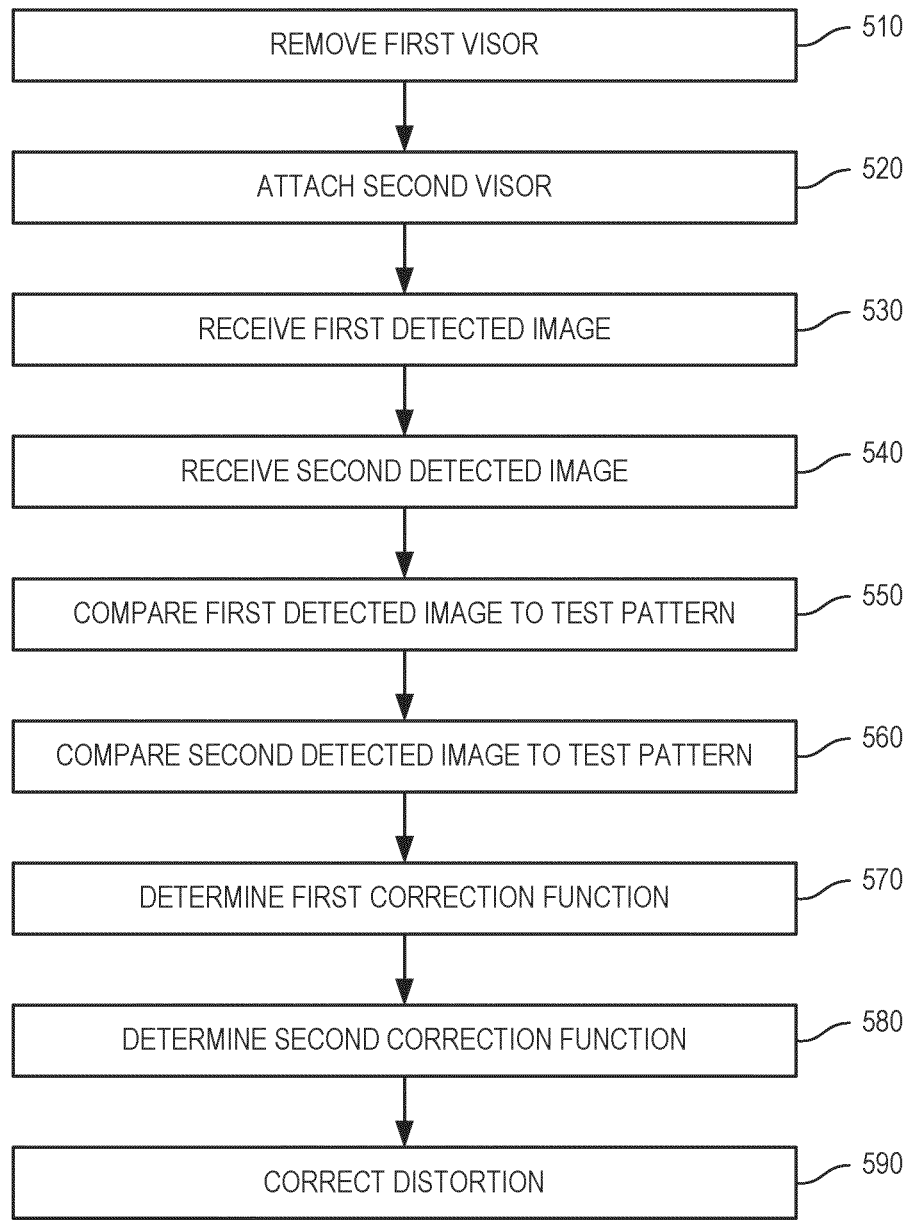
FIG. 4 illustrates a method for characterizing a visor mounted to a helmet according to the inventive concepts disclosed herein.

FIG. 4 illustrates a method for characterizing a visor mounted to a helmet, the helmet having at least one projector for directing light to reflect off the visor to image to a right eye position and a left eye position, according to the inventive concepts disclosed herein. In step 510 a first visor is removed from the helmet 130. The visor may be damaged, for example, requiring replacement. In step 520, the second visor is attached to the helmet 130. The helmet-second visor pair is then characterized in the following steps.

In step 530, the controller 250 receives a first detected image from the first image detector 240, disposed at a right eye position, based on a test pattern. Similarly, in step 540 the controller 250 receives a second detected image from the second image detector 242, disposed at a left eye position, based on a test pattern.

In step 550, the first detected image is compared to the test pattern to determine a first characterization error corresponding to a first distortion of the first detected image. Similarly, in step 560, the second detected image is compared to the test pattern to determine a second characterization error corresponding to a second distortion of the second detected image.

In step 570, a first correction function is determined to correct the first distortion. Similarly, in step 580, a second correction function is determined to correct the second distortion.

In step 590, the first distortion and the second distortion are corrected based on the first correction function and the second correction function, respectively.

Embodiments of the inventive concepts disclosed herein are not limited to a system for characterizing a visor where the controller for correcting the first distortion and the second distortion is integral to the system. Accord to inventive concepts disclosed herein, the controller for correcting the first distortion and the second distortion may be part of the helmet system. Further, according to embodiments of the inventive concepts disclosed herein, the setup may correct may be used for other in-field characterizations such as uniformity, contrast, or brightness.

Embodiments of the inventive concepts disclosed herein are not limited to a system with both a first and second image detector. The system may include a single image detector disposed at a single eye position for example.

Embodiments of the inventive concepts disclosed herein are not limited to using a same test pattern for both the first image detector and the second image detector. The test patterns may be different.

The embodiments of the inventive concepts disclosed herein have been described in detail with particular reference to preferred embodiments thereof, but it will be understood by those skilled in the art that variations and modifications can be effected within the spirit and scope of the inventive concepts.

What is claimed is:

1. A system for characterizing a visor mounted to a helmet, the helmet having at least one projector for directing light to reflect off the visor to image to a right eye position and a left eye position, comprising:
   a first image detector arranged to detect an image of the visor at the right eye position;
   a second image detector arranged to detect an image of the visor at the left eye position;
   a mounting structure configured to mount the image detectors to the helmet;

a controller configured to:
provide a test pattern at the visor;
receive a first detected image of the test pattern at the right eye position from the first image detector;
receive a second detected image of the test pattern at the left eye position from the second image detector;
compare the first detected image of the test pattern at the right eye position to the test pattern to determine a first characterization error corresponding to a first distortion of the first detected image;
compare the second detected image of the test pattern at the left eye position to the test pattern to determine a second characterization error corresponding to a second distortion of the second detected image;
determine a first correction function to correct the first distortion;
determine a second correction function to correct the second distortion; and
correct for the first distortion and the second distortion using the first correction function and the second correction function; and
a positional translator attached to the mounting structure, and configured to translate the first image detector to the right eye position and to translate the second image detector to the left eye position.

2. The system of claim 1 wherein the controller is configured to control the positional translator.

3. The system of claim 1, wherein the controller is configured to determine the first correction function and the second correction function by adjusting parameters of the first and second correction functions.

4. The system of claim 3, wherein the first and second correction functions are polynomials, and the parameters are coefficients of orders of the polynomials.

5. The system of claim 1, wherein the controller includes a memory which stores the test pattern.

6. The system of claim 1, further comprising a temperature detector arranged to detect a temperature of the first and second image detectors, wherein the test pattern selected is based on the temperature detected.

7. The system of claim 1, wherein the determining the first and second correction function includes adjusting parameters of initial correction functions.

8. A method for characterizing a visor mounted to a helmet, the helmet having at least one projector for directing light to reflect off the visor to image to a right eye position and a left eye position, comprising:
removing a first visor from the helmet;
attaching a second visor to the helmet;
receiving a first detected image of a test pattern provided at the second visor from a first image detector disposed at a right eye position;
receiving a second detected image of the test pattern provided at the second visor from a second image detector disposed at a left eye position;
translating the first image detector to the right eye position and translating the second image detector to the left eye position;
comparing the first detected image of the test pattern to the test pattern to determine a first characterization error corresponding to a first distortion of the first detected image;
comparing the second detected image of the test pattern to the test pattern to determine a second characterization error corresponding to a second distortion of the second detected image;
determining a first correction function to correct the first distortion;
determining a second correction function to correct the second distortion; and
correcting for the first distortion and the second distortion based on the first correction function and the second correction function.

9. The method of claim 8, wherein the first correction function and the second correction function are determined by adjusting parameters of the first and second correction functions.

10. The method of claim 9, wherein the first and second correction functions are polynomials, and the parameters are coefficients of orders of the polynomials.

11. The method of claim 8, further comprising detecting a temperature of the first and second image detectors, wherein the test pattern is selected based on the temperature detected.

12. The method of claim 8, wherein the determining the first and second correction function includes adjusting parameters of correction functions determined for the first visor.

13. A system for characterizing a visor mounted to a head attachment region, the head attachment region having at least one projector for directing light to reflect off the visor to image to an eye position, comprising:
an image detector arranged to detect an image at the eye position;
a mounting structure configured to mount the image detector to the head attachment region;
a controller configured to:
provide a test pattern at the visor;
receive a detected image of the test pattern at the visor from the image detector disposed at an eye position;
compare the detected image of the test pattern to the test pattern to determine a characterization error corresponding to a distortion of the detected image;
determine a correction function to correct the distortion; and
correct for the distortion based on the correction function; and
a positional translator attached to the mounting structure, and configured to translate the image detector to the eye position.

14. The system of claim 13, wherein the controller is configured to determine the correction function by adjusting parameters of the correction function.

15. The system of claim 14, wherein the correction function is a polynomial, and the parameters are coefficients of orders of the polynomial.

16. The system of claim 13, wherein the controller includes a memory which stores the test pattern.

17. The system of claim 1, wherein the system is a head worn display, and wherein the head attachment region is a helmet.

* * * * *